F. SHAFFER.
METAL RECEPTACLE.
APPLICATION FILED APR. 6, 1915.
1,215,724.
Patented Feb. 13, 1917.
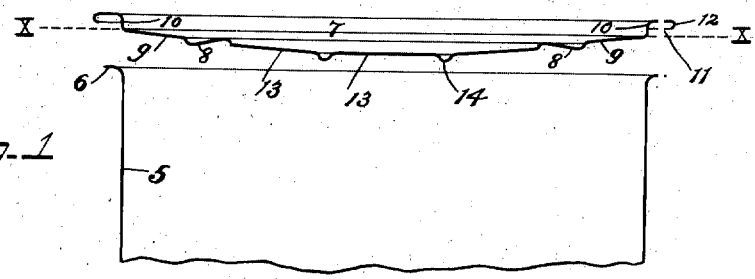
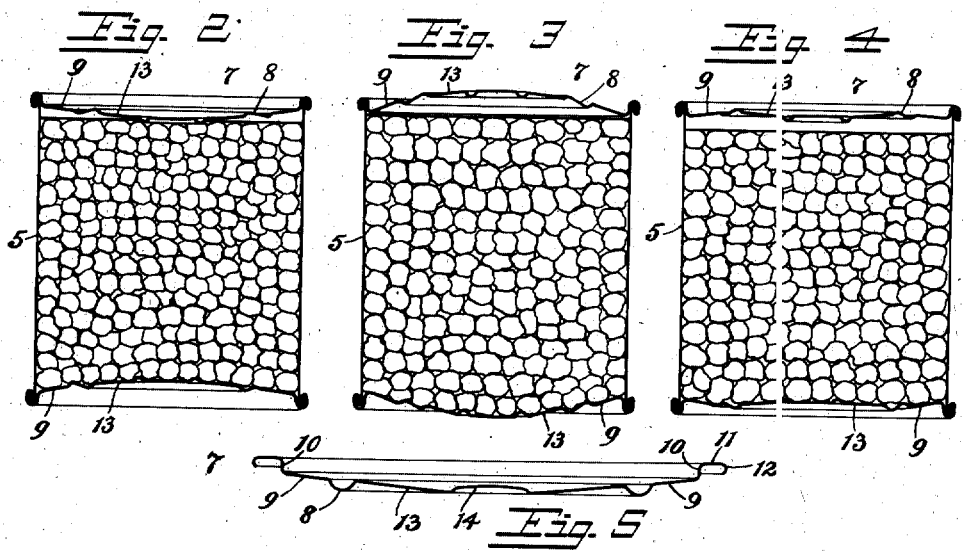
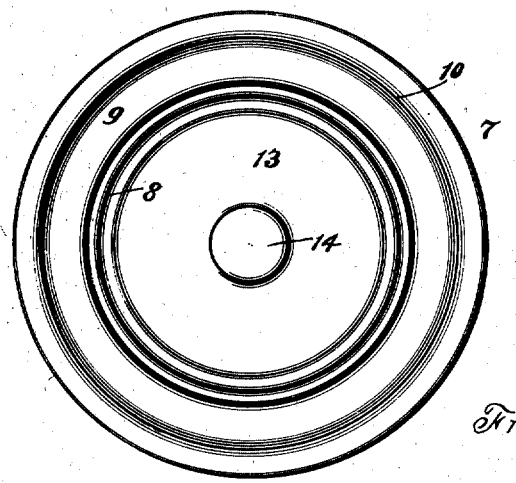
Witness
Russel N. Low
Inventor
Frank Shaffer
By
N. N. Low
Attorney

UNITED STATES PATENT OFFICE.

FRANK SHAFFER, OF EVERETT, WASHINGTON, ASSIGNOR TO AMERICAN CAN COMPANY, A CORPORATION OF NEW JERSEY.

METAL RECEPTACLE.

1,215,724.  Specification of Letters Patent.  Patented Feb. 13, 1917.

Application filed April 6, 1915. Serial No. 19,541.

*To all whom it may concern:*

Be it known that I, FRANK SHAFFER, a citizen of the United States, residing at Everett, in the county of Snohomish and State of Washington, have invented certain new and useful Improvements in Metal Receptacles, of which the following is a specification.

The invention relates to can or container ends for receptacles in which food or other products are to be preserved, and which have a useful function in and after the processing of the filled and closed cans and their contents to maintain a partial vacuum within the can.

A principal object of the invention is to enable the cans to be filled with products which are of normal or atmospheric temperature and which have not been preheated, and to be hermetically closed, and to be thereafter processed, with their contents, in sealed condition.

The processing of hermetically sealed cans at any suitable temperature, say from 212° to 250°, is a comparatively simple and inexpensive operation, and by the mode of procedure above indicated the necessity for expensive machinery and a conveying system, which requires much floor space and is costly to operate, or which is wasteful of steam, or is unsanitary is done away with.

It may be stated that it is necessary for the successful canning, preservation and selling of food products of nearly all descriptions that a space be left within the can above or within the food products, which shall be more or less of a vacuum (to a material degree) when the sealed can and contents are at normal temperature, in order that small amounts of gases, which will be generated even in perfectly preserved foods, may be taken up in such partial vacuum without producing a swelling of the can heads.

It has been usual to attain this result in one of two ways. In the exhaust box process the filled and open or unsealed cans are caused to pass slowly and for a considerable period of time through a partly closed chamber to which steam is admitted. When the cans are open they receive drippings from the condensation on the interior of the exhaust box, the food thus cooked in open cans is inferior in quality and color, the apparatus is expensive and requires much space and attention, it is costly in the consumption and waste of steam and the process except at the expense of a large amount of space and machinery is not rapid. After the contents of the cans are thus heated and expanded the cans are hermetically sealed in such condition, and then processed or cooked for various lengths of time and at various temperatures according to the nature of the product, and the contraction of the contents on cooling is relied upon to produce the necessary partial vacuum within the cans. If the cans have been filled too full no space or insufficient space is left within them on cooling. If they have been insufficiently filled, too much air, and consequently oxygen is sealed within the can, increasing the liability to the production of gases and metal salts, with change of color in the food products, from the combination of such oxygen with the metals of the container or with constituents of the food product.

In the vacuum sealing process the can is sealed in a chamber which has been practically exhausted of air, and is thereafter processed in the case of most products. The machinery for this purpose is costly, and expensive to operate; and the difficulties above mentioned arising from overfilling the cans are also experienced.

By the use of my invention many or all of such difficulties are overcome or diminished, many foods are preserved of better quality and color, the process is rendered more rapid and the cost of the same is much reduced.

The present invention consists in the construction of a portion of the container, preferably the can end, by which I attain the new result that the food product may be, when cold or of atmospheric temperature, hermetically sealed within the container (the can ends being normally of inwardly beveled, concaved or dished form) and then processed at the desired temperature. Such heating and expansion of the can contents causes the said can ends to be outwardly expanded into more or less convex form. Upon cooling, the said can ends will remain permanently expanded, though not ordinarily to the same extent as during the processing, thus maintaining the interior of the can of an increased cubic capacity as compared with the ordinary sanitary or other cans, the ends of which return to their normal inwardly concave form on cooling. Also the central portion or panel of my new can end, while permanently held or braced out beyond its original or normal position which it occupied when the can was sealed and before processing, will itself resume a flat or concave form showing that the can is not what is termed a "swell", "springer" or "flipper". Such permanent holding or bracing out of the can end appears to be caused by the coaction of the central portion or panel with the outer annular panel or portion of the end, which mutually prevent each other from returning inward past the transverse plane in which is situated the extreme outer supporting edge of the end, together with the rigidity which is imparted to it by the fastening of said edge to the body of the container; the internal pressure due to processing and which forced the can end onward past said plane (say about 27 pounds) having been greater than the external atmospheric pressure which tends to force the can end inward when the can and contents become cool. The result is that a desired space and partial vacuum are formed within the cooled can.

A material advantage resulting from the use of my invention is that cans may be entirely filled and nevertheless said space and partial vacuum will be formed, whereas with the ordinary can end no space would be left.

Such being the objects and nature of the invention I will proceed to describe the same with more particularity, having reference to the accompanying drawings in which are illustrated means for carrying the invention into practical effect, without limiting my improvements, in their useful applications, to the particular constructions which, for purposes of example, have been delineated. In the said drawings—

Figure 1 is a vertical sectional view of a can end and a portion of a can body, the said end being somewhat separated from the body in order to show its configuration more clearly, the said view embodying a form of my invention.

Fig. 2 is a vertical sectional view of the can or container filled and sealed, with the parts in the positions which they occupy before processing, which I hereinafter refer to as their original or normal positions.

Fig. 3 is a similar view of the container, showing the parts in the position which they occupy immediately after the completion of the processing.

Fig. 4 is a similar view, with the parts in the position which they occupy after the container and contents have cooled to about normal or atmospheric temperature.

Figs. 5 and 6 are respectively a vertical sectional view and a top plan view of a can end embodying another form of my invention.

Referring to the drawings, the numeral 5 indicates the body of a can formed with a peripheral top flange 6, the said body and the double seam which unites it with the can ends, as herein illustrated, being of the usual sanitary can construction. The can cover and bottom 7, which are hereinafter referred to as the can ends, may be of any suitable peripheral form or configuration. They are herein illustrated as circular, that being the preferred form. The can end is provided at a point intermediate its outer annular portion and its central portion with one, or more annular or circular bends panels or corrugations, the same forming a radially yielding and resilient portion 8. Immediately surrounding the portion 8 is an inwardly and downwardly inclined outer annular portion 9, which may be termed an inclined bevel. I may here state that this bevel need not be direct or straight. The extreme outer portion of the bevel might be horizontal for a small distance, then bending downward, so that the total or average inclination of the said bevel 9 would be about the same as that indicated of the straight bevel in Figs. 1 and 5. Immediately surrounding the bevel or downwardly inclined surface 9 is a substantially vertical annular wall 10. In the sanitary can construction illustrated the wall 10 extends vertically upward from the bevel 9 and thence bends outward and downward, as shown at 11 and 12, in a manner suitable for forming the double seam with the flange 6 of the can body. In a can of the hole and cap soldered construction the wall 10 would extend vertically upward and then downward from the outer edge of the bevel 9 so as to slip over and be soldered to the unflanged end of the can body. Within the said yielding portion 8 is a central portion or panel 13. It will be understood that the foregoing description of can end refers to it in its original or normal condition before it has been assembled with the can body.

The container having been prepared for the reception of a food or other product by seaming together the can body and the bottom can end, the same is then filled to the normal capacity of the can. I may here state the ordinary difficulties from overfilled cans are not usually encountered in the use of my invention, and consequently the container may be filled to within a very short distance of its top edge. This is or may be done without pre-heating of the product, and the contents of the can are or may be of normal or atmospheric temperature. The container is then closed by seaming on the top can end in a suitable closing machine, so as to be hermetically sealed, as shown in Fig. 2. The sealed can with its contents is then subjected to the usual processing, at a suitable temperature, according to the nature of the contained product, such temperature ranging from about 212° to about 250°, such processing continuing for a suitable length of time to cook or sterilize and expand the contents. The internal pressure within the container caused by this process will expand and distend outward the ends of the can, as best seen in Fig. 3.

After the container has been sealed as shown in Fig. 2 the parts 9, 8 and 13 will all be in substantially the positions as are shown in Fig. 1, with the bevel 9 downwardly and inwardly inclined to a plane below the horizontal transverse plane in which are located the extreme outer portions of the bevel 9, and the central portion or panel 13 will be below said transverse plane. This latter plane is indicated by the dotted line $x$ in Fig. 1. But immediately after the processing operation the positions of the portions or panels 9 and 13 are materially different. The internal pressure upon the can end has caused the said portion 9 to bend outward or hinge upon its line of junction with the said vertical wall 10 and to pass up beyond the plane $x$. This outward bending action carries outward the panel or central portion 13, the part 8 yielding slightly to permit the can end to pass the plane $x$. It will be understood that this description of one can end applies to both, the same action taking place in both the top and the bottom of the container.

The processed can is now allowed to cool, say to atmospheric temperature, whereupon the can ends will tend, by reason of atmospheric pressure thereupon and a partial vacuum in the can due to its increased cubic capacity, to resume their original inwardly bent, inclined or concave configuration. But this tendency is resisted by the bracing action of the now outwardly inclined parts 9 on or against the central panel 13, which may be assisted by the set which the metal of the cam end has taken at the juncture of the part 9 with the vertical wall 10. The can ends will, however, partially collapse, the panels 13 assuming a flat or concave, instead of a convex, configuration. This configuration of the central panels indicates that the can is not a "swell" but that its contents are sound, although the can ends as wholes are standing out beyond their original positions. Notwithstanding the said partial collapse of the can ends upon cooling they remain held outward by the co-action of the parts to such extent that a partial vacuum remains within the container which is capable of taking up gases generated from the sound and unspoiled contents of the can.

So far as now known to me the proper and described action of the can end, in expanding outward across the transverse plane $x$ in which is located the extreme outer edge of the can end, and then being permanently held in an outer position beyond said plane against atmospheric pressure resulting from a partial vacuum within the can, depends upon several conditions. The annular beveled outer part of the end must be sufficiently wide, radially, so that its inner part shall have a movement, under internal processing temperature, sufficient to enable it to have an inward and upward bracing action against the outer portion of the central panel or part; and it must not be so wide as to reduce too much the relative diameter of said central portion or prevent the latter from partially collapsing, individually, as described. In Figs. 1 and 2 I have shown relative proportions in this respect which will operate successfully, in the manner described, at processing temperatures from about 212° to 250°. Also, for the best results, the proportions of the end vary slightly according to the processing temperature to which the can end is to be subjected. A can end having a relatively narrow beveled portion will operate at a temperature of 250° but not satisfactorily at 212°, but such difference in width is not necessarily in proportion to such temperatures.

The proportions may also vary with can ends of different diameters. A larger can end may have a bevel of a little greater width, but such difference in width is not usually in proportion to the difference in diameter. The angle of the bevel from the horizontal is also a factor to be considered. According to my present experience an original angle of 8° is right for most conditions and is preferable. I have caused the can end to operate to produce a partial vacuum in the manner described when its bevel was formed at original angles of from 3° to 4°, but I consider such angle too small for the best results at varying temperatures.

The bevel may be of different forms, not necessarily that of a frustum of a cone, provided that it has the described action in maintaining the can of relatively greater cubic capacity, after processing, so as to cause a partial vacuum in the manner set forth. Also the radially yielding and resilient portion, bend or corrugation may be of various forms, and there may be one or more of such bends. But care must be taken not to have said portion too yielding, or the outer annular part or panel will not be able thereby to properly brace out the central panel.

While this container is designed to obviate the necessity for the use of expensive exhaust systems or mechanical means for obtaining vacuum, still it may be used with any of these systems if so desired for any special purpose. With pre-heating exhaust systems added vacuum is thus obtained.

While the accompanying drawings illustrate what I believe to be the preferred embodiment of my invention, it is to be understood that the invention is not limited thereto, but that various changes may be made in the construction, arrangement and proportions of the parts without departing from scope of the invention as defined in the appended claims.

The tin of the can end has a grain due to the rolling operation in its manufacture, and the central panel has a tendency to buckle or bend unevenly. Such buckling is prevented and the central panel 13 aided in bulging and collapsing evenly by the usual central bend 14 which may be of various forms, such as a small circular corrugation which may project either inward as in Fig. 1, or outward, or such as a small central panel, which in Fig. 5 projects outward. This is a feature known in the art.

It will be understood that the positions of the parts as indicated in Figs. 3 and 4 are examples, and will vary with different temperatures of processing. If the temperature is higher the parts may be more expanded and the collapse may be less, with a higher vacuum.

When the can end is stamped out and formed the part 9 may be horizontal, and the part 9 may be given its downward angle or bevel, say of 8°, by the inside seaming chuck which closes and double seams the can ends on to the can body, the under side of this chuck being correspondingly beveled, or otherwise suitably shaped, to press down the can ends by bearing on the part 9 or on other suitable part or parts of the can ends.

What is claimed is:—

1. A container for products, a portion of which is outwardly yieldable and expansible under internal pressure to increase the cubic contents of the container, the said expansible portion comprising means whereby it is held in an outwardly expanded position after said internal pressure is removed, and against external atmospheric pressure, to maintain a partial vacuum within the container.

2. A container for products, a portion of which is outwardly yieldable and expansible under internal pressure to increase the cubic contents of the container, the said expansible portion comprising means whereby it is held in an outwardly expanded position after said internal pressure is removed, and against external atmospheric pressure, to maintain a partial vacuum within the sealed container, the central part of said portion being partly collapsed inward.

3. A container for food products to be processed and preserved, a portion of which is outwardly yieldable and expansible under internal pressure, after the container is sealed and during the processing, to increase the cubic contents of the container, the said portion having means whereby it is held in an outwardly expanded position after the product has cooled and said internal pressure is removed, and against external atmospheric pressure, to maintain a partial vacuum within the container.

4. A container for products, a portion of which is outwardly yieldable and expansible under internal pressure to increase the cubic contents of the container, the said expansible portion having means whereby it is held in an outwardly expanded position after said internal pressure is removed, and against external atmospheric pressure, to maintain a partial vacuum within the sealed container, said means comprising outer and central panels united by a radially yieldable and resilient portion, the said central panel being partly collapsed inward.

5. A sheet metal can end having an annular vertical wall for abutting the inner side of a can body when applied thereto, an annular portion connected directly with the lower edge of such wall and inclined inwardly and downwardly therefrom under the normal conditions of equal pressure above and below the top when the can top is attached to can body, thus forming an obtuse angle with the wall, said top having also a central portion and an annular bend intervening the latter and the outer or obtuse angle portion; the angle of the wall and the contiguous inclined portion and also the bent portion surrounded by the latter both coöperating as hinges to allow the cover to expand in processing, the cover thereafter retaining an expanded position, as shown and described.

6. A sheet metal can top or cover having an annular vertical wall for abutting the side of a can body, and an annular portion connected directly with its lower edge and normally inclined inwardly and downwardly from said edge, thus forming an obtuse angle with said wall, and an annular bend or corrugation which surrounds and joins directly with the inner edge of the inclined portion and constitutes a hinge when the can is processed, as described.

7. A sheet metal can top having a combination of a bevel forming an obtuse angle with the vertical wall of the can top, to be bent to an acute angle by processing; and a corrugated portion at the lower extremity thereof which will serve as a hinge between it and the central portion, to allow the central portion to collapse after processing, whereby the internal capacity of the can is increased permanently.

8. A sheet metal can end with attaching means at its outer edge, having a central portion connected to its outer edge by an inwardly and downwardly inclined bevel, which when the can end is attached to the can body is inclined inwardly and downwardly and is adapted to be forced upwardly and outwardly by processing, deforming itself in a bulged position, bending the metal at the junction of itself and the lower edge of the vertical wall of the can end, which acts as a hinge to allow the can end to distend outwardly whereby the internal capacity of the can is increased permanently.

9. A sheet metal can top having a central portion, a corrugated portion surrounding it and an inwardly and downwardly inclined beveled portion connected directly to the outer edge of the top and surrounding the said corrugation and which is so inclined inwardly and downwardly when the top is applied to a can body, and is adapted to be forced upwardly and outwardly by processing, the said central, corrugated, and beveled portions, all coöperating to support the can top permanently in a position distended relative to its position before processing, which distended position is maintained against the pressure due to a partial vacuum within the can.

10. A sheet metal can top having an annular vertical wall, and a portion connected directly to the lower edge of said vertical wall and inclined inwardly and downwardly, under the normal conditions of equal pressure above and below the top, when the top is attached to a can body, and adapted to be forced upwardly and outwardly by internal pressure so that the metal is bent permanently at the junction of itself and said vertical wall, and a bent or corrugated portion at the inner edge of the incline which serves as a hinge coöperating with the inclined portion and with the angle which the inclined portion forms with the vertical wall to support the can top in an expanded position after the can is processed, thus increasing the internal capacity of the can permanently, as shown.

In testimony whereof I affix my signature in presence of two witnesses.

FRANK SHAFFER.

Witnesses:
C. W. GRAHAM,
H. N. LOW.